Patented July 16, 1946

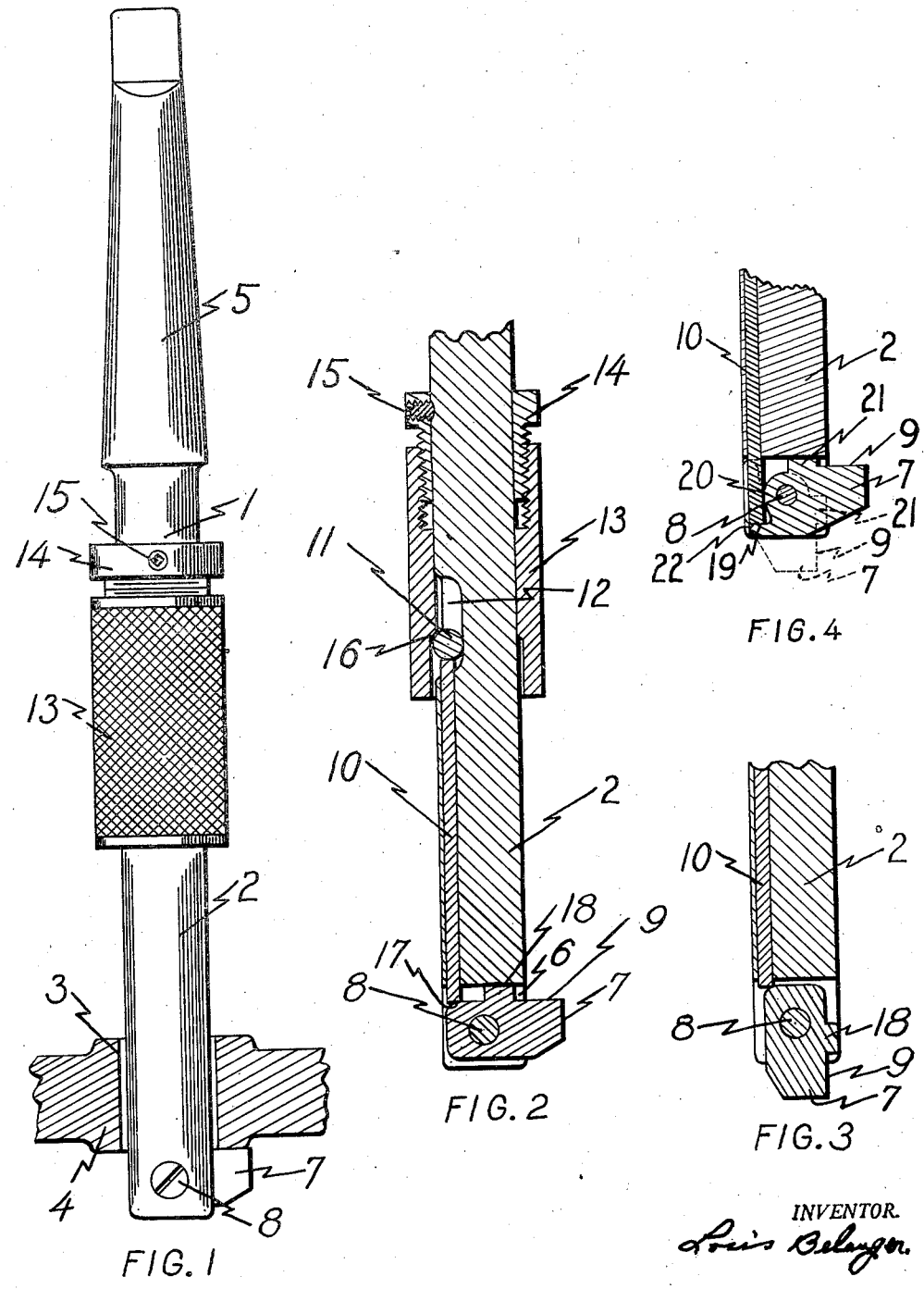

2,404,027

UNITED STATES PATENT OFFICE 2,404,027

SPOT FACING TOOL

Louis Belanger, Salem, Mass.

Application January 26, 1945, Serial No. 574,726

2 Claims. (Cl. 77—58)

This invention relates to rotary cutting tools for use in a drill press milling machine or other spindle type machine tools.

An object of the invention is to provide a tool for performing an internal, substantially blind machining operation accurately and with a minimum of time and effort.

A further object of the invention is to provide a tool having a movable cutting blade operable to permit insertion of the tool in an aperture closely fitting the tool shank and thereafter moved into cutting position by remote control.

A further object of the invention is to provide a tool especially useful to readily perform a spotting or facing operation upon an inaccessible inner face of a wall or other element adjacent to an aperture through the wall.

Other objects and features of the invention will more fully appear from the following description in connection with the accompanying drawing and will be particularly pointed out in the claims.

The tool of the present invention is used subsequently to a boring operation performed upon a drill press, radial drill, milling machine or like machine tool, where it is desired to produce a spot or face which is flat and perpendicular to the axis of the aperture bored. When such a facing operation is required upon the inner surface of the workpiece the operation under certain conditions is difficult to execute. For example, when it is desirable to produce the facing operation without moving the piece or disturbing its initial clamped down position, it has been the practice in performing such operations to project the cutting tool holder through the aperture and inserting the cutting tool in the projecting end thereof. The facing operation is then performed, the tool removed and then the holder removed from the aperture. Such a procedure involves the expenditure of much unproductive time. It is obvious also that when working upon certain complicated workpieces that the inner wall thereof may not be accessible without disturbing its initial position upon the machine which performs the operation. In which case, the present practice would become very awkward and inefficient.

The present invention provides an efficient means for facing the inner surface of the workpiece. A cutting tool is pivotally secured in the end of a tool holder which is adapted to pass through the previously bored aperture. The cutting tool is movable from an inactive position to its cutting position by direct manual or remote control means. To use the tool the cutting tool holder is projected through the workpiece while its cutting tool is in inactive position and then moved into cutting position by actuating the remote control gear on the tool or by the fingers of the operator. The facing operation is then executed by moving the cutting tool into contact with the work after which the cutter is moved into inactive position and the tool removed.

To provide a better understanding of the invention a preferred embodiment thereof will be described and illustrated in the drawing in which:

Figure 1 is a general view of the tool showing it in operating relation to a workpiece;

Figure 2 is a longitudinal sectional view through the lower portion of the tool;

Figure 3 is a detail view showing the inactive position of the cutting blade thereof; and Figure 4 is a detail view of a different embodiment of the invention.

The body 1 of the tool may have any desirable construction. As shown its lower or mandrel portion 2 is cylindrical and of a size to fit the aperture 3 in the workpiece 4. The upper or driven end of the body is shaped to a standard taper shank such as a Morse taper 5, adapted to be received in the spindle of the machine in which it is used. Any suitable driving shank may be used however. The lower end of the mandrel 2 has a slot 6 formed therein within which a cutting tool 7 is received. The cutter is pivoted therein upon a pivot screw 8 extending through the cutter and also through the ears formed by the slot 6.

The cutter 7 is adapted to swing down in the position shown in Figure 3, at which time no portion of the cutter projects laterally beyond the surface of the mandrel 2 thus permitting the mandrel to pass freely through the previously bored aperture 3. Means are provided for moving the cutter 7 into its cutting position shown in Figures 1 and 2 in which position the cutting edge 9 thereon is properly located to accurately perform the facing operation by an upward feeding motion of the tool. To control the position of the cutter an actuator rod 10 is slidably received in a longitudinal aperture formed adjacent to the peripheral surface of the mandrel 2. The upper end of the rod 10 desirably is engaged by a ball bearing 11 which is freely movable in a vertical slot 12 formed in the side of the mandrel above the end of the rod.

A sleeve 13 surrounds and is rotatable upon the mandrel 2 and has screw threaded engagement therewith. When rotated the sleeve moves up or down along the mandrel. The threads for actuating the sleeve 13 are cut upon another sleeve 14 which in turn is rigidly secured upon the mandrel as by means of one or more set screws 15. This double sleeve construction permits the sleeves to be removed upwardly off the mandrel 2 which in turn permits the assembly of the rod and ball bearing in their proper position before the sleeve 13 is moved into its operating position.

The sleeve 13 is counterbored for a short distance from its bottom end to form a shoulder 16 which engages the upper portion of the ball bearing 11. When the sleeve 13 is moved down the ball bearing is forced down against the top of the rod which in turn is forced down.

The bottom of the rod engages the portion of the cutter 7 to the left of the pivot screw 8 acting to solidly lock it in cutting position as shown in Figure 2.

In the form of the invention shown in Figures 2 and 3 the cutter 7 is moved up into cutting position from its inactive position with the fingers of the operator's hand the rod 10 having been retracted to permit the cutter to pivot upon the screw 8, after which the rod is forced down by rotating the sleeve 13. The lower end of the rod engages the top surface 17 of the tool 7 acting to lock it in cutting position. A preferred means for properly aligning the tool is to provide an abutment 18 which engages the bottom face of the slot 6 thereby positively determining the tool position.

In Figure 4, a different embodiment of the invention is shown having another form of cutter. In this structure the cutter is provided with a shoulder 19 situated near the bottom face of the cutter in position to be engaged by the rod 10. The cutter may present any suitable contour consistent with its proper operation. As shown in the drawing it has a cylindrical portion 20 concentric with the screw 8 extending from the shoulder 19 upward to a point near the upper portion of the cutter. An abutment 21 projects from the upper edge of the cutter acting to determine its operating position shown in full lines in Figure 4.

When inserting the tool mandrel into the workpiece the cutter is swung down into the dotted line position. To permit the cutter to assume this position the rod 10 is retracted to allow the shoulder 19 to move upward 90°. The shoulder 19 desirably is provided with another actuating face 22 which is engaged by the rod 10 when the cutter is in its depressed position.

In this form of the invention the cutter may be swung into cutting position wholly by remote control. By rotating the sleeve 13 the rod 10 is forced downward which in turn swings the cutter into cutting position by engagement of the rod upon the surface 22 and the shoulder 19. Thus the tool may be used in a situation where the inner face of the workpiece is inaccessible thus preventing manually swinging the cutter as in the other form of the invention above described.

A tool embodying the invention is capable of very accurate work especially when the mandrel 2 is the same dimension as the aperture 3 in the workpiece. However, it is possible to use the tool for facing operations on workpieces having apertures larger than the tool mandrel.

What I claim is:

1. A spot facing tool comprising a body having driving means at one end to be received in the spindle of a machine tool and a cutter mandrel at its other end, a cutter freely rotatable about a transverse axis in the outer end of said mandrel to swing downward into position in line with the mandrel axis thereby to permit the mandrel to be passed through a workpiece aperture, a rod extending lengthwise of said mandrel having one of its ends engaging said tool and its other end extending to a remote point upwardly in the said mandrel, a sleeve surrounding and having threaded engagement with said mandrel and means for transferring longitudinal motion of the sleeve to the rod whereby the rod engages and locks the cutter in its cutting position with its end projecting laterally outward beyond said mandrel.

2. A spot facing tool comprising a body having driving means at one end and a cutter mandrel at its other end, a tool pivoted upon a transverse axis in the end of said mandrel and operable to swing down into alignment with the mandrel to permit the tool to be projected through an aperture in a workpiece, a shoulder on said tool positioned laterally from the pivot axis thereof, a rod of substantial length extending longitudinally of said mandrel engaging said shoulder at one of its ends, screw threaded means on said mandrel at a position remote from said tool, means acting to transfer motion from said threaded means to the end of said rod remote from said tool, whereby the tool may be moved from inactive to cutting position by remote control by actuating said threaded means.

LOUIS BELANGER.